Patented Nov. 12, 1940

2,221,339

UNITED STATES PATENT OFFICE 2,221,339

UTILIZATION OF METALLO-ORGANIC COMPOUNDS FOR TREATMENT OF CIRCULATING WATERS AND SURFACES COMING INTO CONTACT WITH WATER

William M. Allison, New York, N. Y., assignor to Oakite Products, Inc., a corporation of New York No Drawing. Application August 18, 1936, Serial No. 96,701

11 Claims. (Cl. 210—23)

The present invention relates to improvements in the art of treating condenser and circulating waters to prevent the formation of slimes and algae therein and treating surfaces in contact with water to remove and prevent slime formations and algae growths thereon.

In the past the general practice for treating condenser and circulating water and surfaces in contact with water to remove organic accumulations and growths has been to apply some form of available chlorine to the waters coming in contact with such surfaces, to add copper sulphate to the waters, or to clean them periodically with detergent solutions or by mechanical means.

It has been found that the above methods present many difficulties. Treating the condensing and circulating waters with chlorine or copper sulphate presents the hazard of corrosion of the metal parts unless they are especially provided with a coating of a metal such as silver which will not corrode in the presence of these chemicals. Periodic cleaning with detergents or by mechanical means necessitates taking equipment out of service while it is being cleaned besides requiring a large amount of labor. Chlorine presents special disadvantages in requiring expensive and complicated apparatus for its application and the constant danger of having chlorine under high pressure in the vicinity of workmen. Also, it is necessary to make constant additions of chlorine or compounds with available chlorine to the water being treated as the chlorine in the solutions is rapidly dissipated.

There has been the need for some material that, when placed in waters which were recirculated for any purpose in which slime or algae growth has accumulated on the surfaces of the equipment with which the water comes in contact, would inhibit the growth of the organisms causing these accumulations, or kill and remove them without affording the aforementioned disadvantages.

I have found that metallo-organic compounds having germicidal action are admirably suited for this purpose. The concentration of the metallo-organic compound may be varied in the solution according to the effectiveness of the material employed and the conditions under which it is to be employed.

The action of the germicidal metallo-organic compounds is such that upon addition to circulation and cooling waters they will act to prevent slime and algae accumulations entirely. Furthermore, if they are added to the systems wherein slime and algae have accumulated upon the surfaces in contact with water, it has been found that they may not only prevent further accumulations but also kill those already present and cause them to loosen and be capable of removal by the flow of water or by gravitational force. The extent of this latter action is more or less determined by the amount of material applied to the water. If smaller quantities of the metallo-organic compounds are employed than would be necessary to kill the algae growths but enough to inhibit their growth, there would not necessarily be an immediate removal, but after a long period of time the disintegration of the slime forming organisms will take place and the system is gradually cleared of any accumulations which were present when the materials were first added.

It has also been found that, even though large quantities of organic impurities are introduced into the waters or are already present in them, when the metallo-organic compounds are introduced, they have no effect upon the sterilizing power of the compound or upon its inhibiting power. This is contrary to the findings when compounds containing available chlorine are introduced into such circulating waters. The oxidizing power of such compounds permits an attack on the oxidizable inorganic and organic materials present in the system. Such oxidizing action is, in fact, responsible for the sterilizing action in the solutions. Therefore, since the selective action of chlorine compounds generally used for slime control in water circulating systems is not great enough to assure action only on the slime-forming organisms, a great deal of the available chlorine is dissipated in acting upon other materials in the system.

Since the inhibiting or killing action of the metallo-organic germicidal compounds is not derived from their oxidizing power, and since they are not inhibited in this action by ordinary materials found in water circulating systems, no amount of organic materials likely to be present in the water will have any substantial effect upon the activity of such compounds in the treatment of water or the surfaces with which water comes in contact in order to prevent and remove slime and algae accumulations.

The metallo-organic compounds which have germicidal properties are many, and their composition for use in the treatment of waters and surfaces coming into contact with water is only limited by the requirement that they be stable to certain salts and metals and organic impurities with which they may come in contact in any water or system in which they were contained.

It has been found that, in certain cases, as little as three parts of the metallo-organic compound in ten million parts of water are effective in preventing the growth of slime organisms in the water. Various metallo-organic compounds differ in their germicidal power, and therefore the quantity of material used depends more or less upon its germicidal activity.

The solubility of the metallo-organic germicides is important only insofar as the possibility of dissolving the quantity of material necessary to inhibit the growth of, or kill, the slime-forming organisms is concerned. For instance, if it is found that the metallo-organic compound being used will inhibit the growth of the organisms in the water in any system effectively at a concentration of ten parts per million, then the solubility of this compound need not be greater than 0.001%. The solubility of such compounds may be greatly affected by the hydrogen-ion concentration of the solution. In most cases, the metallo-organic compounds are more soluble in alkaline solution than in neutral or acid solution. In other cases these compounds go into solution more readily in an acid reacting medium. This is not wholly a matter of solution but may, in many cases, be due in part to a change in character of the metallo-organic compound due to a chemical reaction.

An example of what may happen when a metallo-organic compound is introduced into an alkaline solution is the case of phenyl mercuric chloride which is converted to phenyl mercuric hydroxide. A similar reaction would take place between the acid radical of a metallo-organic compound and a base when any of these compounds are placed in an alkaline solution. Similarly, if a metallo-organic compound such as phenyl mercuric hydroxide is introduced into an acid solution such as hydrochloric acid, the reaction which will take place will convert the compound to phenyl mercuric chloride.

The metallo-organic compounds which are preferably employed in accordance with this invention are germicidal metallo-organic compounds which are composed of a metal or metals having a valence above one and wherein at least one of the valence bonds of the metal or metals is attached to a nitrogen or carbon atom of an organic radical. A representative formula for such a compound is $R_n$—$Me_p$—$X_m$, in which Me may be any metal or metals having a valence above one which will form metallo-organic compounds having germicidal properties; R may be any organic radical wherein any or none of the hydrogen atoms attached to the carbon atoms are substituted by elements or groupings, R having the metal or metals Me attached to a carbon or nitrogen atom; and X is an inorganic or organic radical or grouping, the latter of which is preferably linked to the metal or metals Me by means of oxygen, nitrogen, sulphur, carbon, or phosphorus, except in cases where there is a double metal linkage; $n$, $m$, and $p$ represent integers.

These metallo-organic compounds possess special advantages over inorganic compounds containing the same metals, as they are inert with respect to metals. Most metals having germicidal properties are low in the electromotive series, and therefore below the metals from which most of the cooling systems are made, and when solutions of their salts are placed in contact with these metals, replacement of the metallic ion in solution by the metal of the vessel takes place. The combination of the metallic atom with an organic radical by means of a nitrogen or a carbon atom prevents the ionization of the metallic atom alone and thereby prevents the usual reaction which may take place between the metal vessel and the compound used. An example of this is the interaction between an iron vessel and the previously employed copper sulphate, whereby metallic copper is precipitated and iron from the vessel goes into solution as ferrous sulphate.

All metallo-organic compounds do not have pronounced germicidal properties but such compounds, when combined with other germicidal materials enhance the germicidal activity of both in excess of the combined germicidal values of the materials employed.

An example of this enhancement of the germicidal activity of a compound is that of the reaction between amino phenyl mercuric acetate and methyl oleamide ethyl sulfonic acid. While both materials have germicidal powers, that of the mercury compound being greater than that of the sulfonic acid compound, when the two are combined, the germicidal activity of the combination is greater than the combined power of the two when they are used alone.

Examples of compounds having germicidal power and suitable in the process are phenyl mercuric acetate—$C_6H_5HgC_2H_3O_2$, amino phenyl mercuric acetate—$NH_2C_6H_4HgC_2H_3O_2$, diphenyl mercury—$(C_6H_5)_2Hg$, phenyl mercuric sodium thioglycollate—$C_6H_5HgSCH_3COONa$, phenyl arsenious disodium thioglycollate—

$$C_6H_5As(SCH_3COONa)_2,$$

amino phenyl copper acetate—

$$NH_2C_6H_4CuC_2H_3O_2,$$

arsenobenzene and its derivatives—$As_2(C_6H_5)_2$, phenyl mercury nicotinate—$C_6H_5HgOOCHC_5H_4$, and the metallo-organic compounds having the metal linked to the nitrogen group such as mercury diacetamide—$Hg(HNC_2H_3O)_2$ and those with the imido linkage such as phenyl mercuric guanidine—$C_6H_5HgNC(NH_2)_2$. It is also possible to use that type of compound in which two or more similar or dissimilar metal atoms are attached to the same organic radical as represented by aniline 2-6-mercuric hydroxide-4-sodium arsenate—$NH_2C_6H_2(HgOH)_2AsOONa$.

While in most cases it will be found advisable to use a single compound for producing the desired effect of preventing the accumulation of slime organisms in any system or on surfaces coming into contact with waters, it is possible and in some cases would be desirable to use a combination of the various metallo-organic compounds which are compatible with each other to combat more effectively many types of microorganisms in a system.

It is also advisable in most cases to incorporate compounds which will prevent corrosion of the metal parts contained in cooling systems with the water in the system. This is practical since the metal constituents of the germicidal metallo-organic compounds are inert to the compounds usually employed for such purposes, such as alkalis and salts of the alkali metals.

Furthermore, in some cases it has been found advantageous to add alkaline materials and wetting agents to the water systems together with the germicidal metallo-organic compounds, as the increased wetting properties imparted to the waters by wetting agents and also the increased solubility of the metallo-organic compounds imparted by the alkaline materials, tends to give these compounds greater efficiency for preventing and removing organic growths and accumulations on surfaces in contact with water.

In carrying out this invention a product may be prepared which, upon addition to the water in the system in which it is wished to control algae and slime growths, is balanced to lend the properties which are desired in the solution other than the control of organic growths. For instance, if it is desired to impart qualities to the solution which will protect iron and steel equipment from rusting or corrosion, some material which will give this property may be incorporated in the product carrying the metallo-organic compound. Again, if there is no action desired but that for control of the organic growths and it is desired to use a diluent for convenience in application of the metallo-organic compound, some neutral material which would not be objectionable in the recirculating waters may be used.

The proportions of the alkaline materials or diluents may be varied widely; thus a mixture consisting of 1 part metallo-organic compounds and 99 parts of the alkaline material or neutral diluent may serve as an example.

The following examples are cited as illustrations.

| | Parts |
|---|---|
| 1. Sodium silicate | 50 |
| Trisodium phosphate | 48 |
| Metallo-organic compound | 2 |

When such a compound is used at concentrations of 1 pound to 500 gallons of water, it provides a solution containing approximately 4.8 parts of metallo-organic compound per million parts of water. Such a compound has been found effective for preventing algae growth and corrosion of metallic surfaces in contact with the water.

| | Parts |
|---|---|
| 2. Sodium sulfate | 98 |
| Metallo-organic compound | 2 |

When such a compound is used at a concentration of 1 pound to 500 gallons of water, it provides a solution containing approximately 4.8 parts of metallo-organic compound per million parts of water. Such a compound would only be effective for preventing algae growth and would not impart any anti-corrosion properties to the water. The sodium sulfate may be replaced by some neutral liquid solvent.

The method of application of these compounds to circulation waters may be any method employed at present for application of other materials. For example, the addition may be by adding solutions of the compounds or by dissolving the required amount of dry compounds directly in the circulation water. In most systems for recirculation there is a constant loss of solution caused by overflow or spray. The replacement of the germicidal materials lost may be intermittent or continuous, automatic or manual, in solution or by dry feed.

While the invention has been explained mainly with reference to circulating water systems it is obvious that it has much wider application as it may be employed whenever it is desirable to prevent or remove organic slime accumulations and growths from surfaces in contact with water. For example, it may be employed for killing or inhibiting the growth of micro-organisms in circulating water and on surfaces in contact with water as found in power plants, cooling systems for industrial and domestic use, swimming pools, paper mills, air conditioning and the like.

Having described my invention what I now claim as new and desire to secure by Letters Patent is as follows:

1. A method of preventing and removing accumulations of organic films and slimes on surfaces in contact with a recirculating water supply and subject to such accumulations of films and slimes which comprises adding a germicidal metallo-organic compound to such recirculating water supply in contact with said surfaces.

2. A method of preventing and removing accumulations of organic films and slimes on surfaces in contact with a recirculating water supply and subject to such accumulations of films and slimes which comprises adding a germicidal metallo-organic compound to the water in contact with such surfaces, said metallo-organic compound containing an organic radical and at least one metal having a valence of at least two which will form metallo-organic compounds having germicidal properties, such metal being in a substantially un-ionizable form.

3. A method of preventing and removing accumulations of organic films and slimes on surfaces in contact with a recirculating water supply and subject to such accumulations of films and slimes which comprises adding a germicidal metallo-organic compound to such recirculating water supply in contact with said surfaces, said metallo-organic compound containing an organic radical and at least one metal having a valence of at least two, at least one of the valence bonds of such metal being attached to an atom of the group consisting of nitrogen and carbon of said organic radical.

4. A method of treating water to inhibit the growth of micro-organisms which cause slime deposits and algae growths on surfaces normally in contact with a recirculating water supply and subject to such deposits and growths which comprises adding to such recirculating water supply in contact with said surfaces a germicidal metallo-organic compound containing an organic radical, and at least one metal having a valence of at least two, at least one of the valence bonds of such metal being attached to an atom of the group consisting of nitrogen and carbon of said organic radical.

5. A method of preventing and removing accumulations of organic films and slimes on surfaces in contact with a recirculating water supply and subject to such accumulations of films and slimes which comprises adding to such recirculating water supply in contact with said surfaces a metallo-organic compound having the general formula $R_n$—$Me_p$—$X_m$ wherein Me is at least one metal having a valence of at least two which will form metallo-organic compounds having germicidal properties, R is any organic radical having said Me attached to an atom selected from the group consisting of nitrogen and carbon, X is selected from the group consisting of inorganic and organic radicals, and $m$, $p$ and $n$ represent integers.

6. A method of preventing and removing accumulations of organic films and slimes on surfaces in contact with a recirculating water supply and subject to such accumulations of films and slimes which comprises adding to such recirculating water supply in contact with said surfaces a metallo-organic compound having the general formula $R_n$—Me—$X_m$ wherein Me is a metal having a valence of at least two which will form metallo-organic compounds having germicidal properties, R is any organic radical having the metal Me attached to an atom selected from the group consisting of nitrogen and carbon, X is an organic radical having the metal Me attached to the organic radical by an atom selected from the group consisting of oxygen, nitrogen, sulphur, carbon and phosphorus, and $m$ and $n$ represent integers.

7. A method of preventing and removing accumulations of organic films and slimes on surfaces in contact with a recirculating water supply and subject to such accumulations of films and slimes which comprises adding a germicidal metallo-organic compound and a detergent to such recirculating water supply in contact with said surfaces.

8. In a method of preventing and removing accumulations of organic films and slimes on surfaces in contact with a recirculating water supply and subject to such accumulations of films and slimes, the step comprising adding diphenyl mercury to such recirculating water supply in contact with said surfaces.

9. A method of preventing and removing accumulations of organic films and slimes on surfaces in contact with a recirculating water supply and subject to such accumulations, which comprises adding to the recirculating water supply in contact with said surfaces a germicidal metallo-organic compound having the general formula $R_n$—$Hg_p$—$X_m$ wherein R is an aromatic radical having said Hg attached to an atom selected from the group consisting of nitrogen and carbon, X is selected from the group consisting of inorganic and organic radicals, and $n$, $p$ and $m$ represent integers.

10. A method of preventing and removing accumulations of organic films and slimes on surfaces in contact with a recirculating water supply and subject to such accumulations, which comprises adding to the recirculating water supply in contact with said surfaces a germicidal metallo-organic compound having the general formula $R_n$—$As_p$—$X_m$ wherein R is an aromatic radical, having said As attached to an atom selected from the group consisting of nitrogen and carbon, X is selected from the group consisting of inorgranic and organic radicals, and $n$, $p$ and $m$ represent integers.

11. A method of preventing and removing accumulations of organic films and slimes on surfaces in contact with a recirculating water supply and subject to such accumulations, which comprises adding to the recirculating water supply in contact with said surfaces a germicidal metallo-organic compound having the general formula $R_n$—$Cu_p$—$X_m$ wherein R is an aromatic radical having said Cu attached to an atom selected from the group consisting of nitrogen and carbon, X is selected from the group consisting of inorganic and organic radicals, and $n$, $p$ and $m$ represent integers.

WILLIAM M. ALLISON.